(12) United States Patent  (10) Patent No.: US 9,280,251 B2
Shih  (45) Date of Patent: Mar. 8, 2016

(54) FUNNELED TOUCH SENSOR ROUTING

(71) Applicant: Apple Inc., Cupertino, CA (US)

(72) Inventor: David H. C. Shih, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 14/329,719

(22) Filed: Jul. 11, 2014

(65) Prior Publication Data

US 2016/0011702 A1    Jan. 14, 2016

(51) Int. Cl.
  *G06F 3/044*  (2006.01)
  *G06F 3/047*  (2006.01)
(52) U.S. Cl.
  CPC ............. *G06F 3/047* (2013.01); *G06F 3/044* (2013.01)
(58) Field of Classification Search
  CPC ....... G06F 3/044; G06F 3/045; G06F 3/0412; G06F 3/0416; G06F 3/046; G06F 2203/04111; G06F 2203/04112; G06F 2203/04113
  See application file for complete search history.

(56) References Cited

U.S. PATENT DOCUMENTS

| | | |
|---|---|---|
| 4,304,976 A | 12/1981 | Gottbreht et al. |
| 4,659,874 A | 4/1987 | Landmeier |
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,543,590 A | 8/1996 | Gillespie et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,129,935 B2 | 10/2006 | Mackey |
| 7,138,686 B1 | 11/2006 | Banerjee et al. |
| 7,184,064 B2 | 2/2007 | Zimmerman et al. |
| 7,538,760 B2 | 5/2009 | Hotelling et al. |
| 7,663,607 B2 | 2/2010 | Hotelling et al. |

(Continued)

FOREIGN PATENT DOCUMENTS

| CN | 1672119 A | 9/2005 |
|---|---|---|
| CN | 1711520 A | 12/2005 |

(Continued)

OTHER PUBLICATIONS

Final Office Action mailed Aug. 31, 2015, for U.S. Appl. No. 14/157,737, filed Jan. 17, 2014, 27 pages.

(Continued)

*Primary Examiner* — Kevin M Nguyen
(74) *Attorney, Agent, or Firm* — Morrison & Foerster LLP

(57) ABSTRACT

A touch sensor panel. In some examples, a first touch pixel can be coupled to a first sense connection, and a second touch pixel can be coupled to a second sense connection. In some examples, a first portion of the first sense connection can be disposed in a first region of the touch sensor panel, a second portion of the second sense connection can be disposed in the first region, and a third portion of the second sense connection can be disposed in a second region of the touch sensor panel. In some examples, a width of the third portion of the second sense connection can be larger than a width of the second portion of the second sense connection.

25 Claims, 6 Drawing Sheets

(56) References Cited

U.S. PATENT DOCUMENTS

| | | |
|---|---|---|
| 8,120,371 B2 | 2/2012 | Day et al. |
| 8,223,133 B2 | 7/2012 | Hristov |
| 8,319,747 B2 | 11/2012 | Hotelling et al. |
| 8,441,464 B1 | 5/2013 | Lin et al. |
| 8,479,122 B2 | 7/2013 | Hotelling et al. |
| 8,484,838 B2 | 7/2013 | Badaye et al. |
| 8,487,898 B2 | 7/2013 | Hotelling |
| 8,576,193 B2 | 11/2013 | Hotelling |
| 8,593,410 B2 | 11/2013 | Hong |
| 8,593,425 B2 | 11/2013 | Hong et al. |
| 8,633,915 B2 | 1/2014 | Hotelling et al. |
| 8,982,096 B2 | 3/2015 | Hong et al. |
| 2004/0017362 A1 | 1/2004 | Mulligan et al. |
| 2004/0090429 A1 | 5/2004 | Geaghan et al. |
| 2004/0239650 A1 | 12/2004 | Mackey |
| 2005/0073507 A1 | 4/2005 | Richter et al. |
| 2005/0083307 A1 | 4/2005 | Aufderheide et al. |
| 2005/0146509 A1 | 7/2005 | Geaghan et al. |
| 2005/0270039 A1 | 12/2005 | Mackey |
| 2005/0280639 A1 | 12/2005 | Taylor et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2007/0008299 A1 | 1/2007 | Hristov |
| 2007/0074914 A1 | 4/2007 | Geaghan et al. |
| 2007/0229468 A1 | 10/2007 | Peng et al. |
| 2007/0247443 A1 | 10/2007 | Philipp |
| 2007/0279395 A1 | 12/2007 | Philipp |
| 2008/0062139 A1 | 3/2008 | Hotelling et al. |
| 2008/0074398 A1 | 3/2008 | Wright |
| 2008/0136787 A1 | 6/2008 | Yeh et al. |
| 2008/0158167 A1 | 7/2008 | Hotelling et al. |
| 2008/0158181 A1 | 7/2008 | Hamblin et al. |
| 2008/0264699 A1 | 10/2008 | Chang et al. |
| 2008/0277259 A1 | 11/2008 | Chang |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0054107 A1 | 2/2009 | Feland et al. |
| 2009/0091551 A1 | 4/2009 | Hotelling et al. |
| 2009/0182189 A1 | 7/2009 | Lira |
| 2009/0194344 A1 | 8/2009 | Harley et al. |
| 2009/0236151 A1 | 9/2009 | Yeh et al. |
| 2009/0242283 A1 | 10/2009 | Chiu |
| 2009/0267902 A1 | 10/2009 | Nambu et al. |
| 2009/0303189 A1* | 12/2009 | Grunthaner .............. G06F 3/044 345/173 |
| 2009/0309850 A1 | 12/2009 | Yang |
| 2009/0314621 A1 | 12/2009 | Hotelling |
| 2009/0315854 A1 | 12/2009 | Matsuo |
| 2010/0059294 A1 | 3/2010 | Elias et al. |
| 2010/0079384 A1 | 4/2010 | Grivna |
| 2010/0149108 A1 | 6/2010 | Hotelling et al. |
| 2010/0328228 A1 | 12/2010 | Elias |
| 2010/0328248 A1 | 12/2010 | Mozdzyn |
| 2011/0007020 A1 | 1/2011 | Hong |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2013/0100038 A1 | 4/2013 | Yilmaz et al. |
| 2013/0120303 A1 | 5/2013 | Hong et al. |
| 2013/0224370 A1 | 8/2013 | Cok et al. |
| 2013/0257798 A1 | 10/2013 | Tamura et al. |
| 2014/0022186 A1 | 1/2014 | Hong et al. |
| 2014/0111707 A1 | 4/2014 | Song et al. |
| 2014/0132860 A1 | 5/2014 | Hotelling et al. |
| 2014/0160376 A1* | 6/2014 | Wang ...................... G06F 3/044 349/12 |
| 2014/0267128 A1* | 9/2014 | Bulea ...................... G06F 3/044 345/174 |
| 2014/0354301 A1 | 12/2014 | Trend |
| 2015/0227240 A1 | 8/2015 | Hong et al. |

FOREIGN PATENT DOCUMENTS

| | | |
|---|---|---|
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| DE | 11 2008 001 245 T5 | 3/2010 |
| EP | 0 853 230 A1 | 7/1998 |
| EP | 1 192 585 A1 | 12/2000 |
| EP | 1 192 585 B1 | 12/2000 |
| EP | 1 573 706 A2 | 2/2004 |
| EP | 1 573 706 A3 | 2/2004 |
| EP | 1 644 918 A2 | 12/2004 |
| EP | 2 077 489 A1 | 7/2009 |
| GB | 1 546 317 A | 5/1979 |
| GB | 2 144 146 A | 2/1985 |
| GB | 2 428 306 A | 1/2007 |
| GB | 2 437 827 A | 11/2007 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2007-018515 A | 1/2007 |
| JP | 2008-510251 A | 4/2008 |
| TW | M344522 | 11/2008 |
| TW | M344544 | 11/2008 |
| WO | WO-01/97204 A1 | 12/2001 |
| WO | WO-02/080637 A1 | 10/2002 |
| WO | WO-2005/114369 A2 | 12/2005 |
| WO | WO-2006/023147 A2 | 3/2006 |
| WO | WO-2006/023147 A3 | 3/2006 |
| WO | WO-2006/104745 A2 | 10/2006 |
| WO | WO-2006/104745 A3 | 10/2006 |
| WO | WO-2006/130584 A2 | 12/2006 |
| WO | WO-2006/130584 A3 | 12/2006 |
| WO | WO-2007/034591 A1 | 3/2007 |
| WO | WO-2007/054018 A1 | 5/2007 |
| WO | WO-2007/146785 A2 | 12/2007 |
| WO | WO-2007/146785 A3 | 12/2007 |
| WO | WO-2008/007118 A2 | 1/2008 |
| WO | WO-2008/007118 A3 | 1/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/132146 A1 | 10/2009 |
| WO | WO-2009/132150 A1 | 10/2009 |
| WO | WO-2010/117882 A2 | 10/2010 |

OTHER PUBLICATIONS

Cassidy, R. (Feb. 23, 2007). "The Tissot T-Touch Watch—A Groundbreaking Timepiece," located at <http://ezinearticles.com/?The-Tissot-T-Touch-Watch---A-Groundbreaking-Timepiece&id . . . >, last visited Jan. 23, 2009, two pages.

Chinese Search Report mailed Jan. 7, 2011, for CN Application No. 2009200081997, filed Apr. 24, 2009, with English Translation, 14 pages.

Chinese Search Report mailed Jan. 10, 2011, for CN Application No. 2008201338142, filed Sep. 27, 2008, with English Translation, 23 pages.

Chinese Search Report completed Jun. 3, 2011, for CN Patent Application No. ZL2009201524013, with English Translation, 20 pages.

European Search Report mailed Mar. 19, 2009, for EP Application No. 08017396.6, filed Oct. 8, 2008, seven pages.

Final Office Action mailed Jun. 8, 2011, for U.S. Appl. No. 12/038,760, filed Feb. 27, 2008, 20 pages.

Final Office Action mailed Dec. 15, 2011, for U.S. Appl. No. 12/333,250, filed Dec. 11, 2008, 12 pages.

Final Office Action mailed Jan. 19, 2012, for U.S. Appl. No. 12/110,024, filed Apr. 25, 2008, 12 pages.

Final Office Action mailed Aug. 31, 2012, for U.S. Appl. No. 12/110,075, filed Apr. 25, 2008, 15 pages.

Final Office Action mailed Dec. 24, 2012, for U.S. Appl. No. 12/110,024, filed Apr. 25, 2008, 21 pages.

(56) References Cited

OTHER PUBLICATIONS

Final Office Action mailed Feb. 5, 2013, for U.S. Appl. No. 12/500,911, filed Jul. 10, 2009, 15 pages.
Final Office Action mailed Jul. 23, 2013, for U.S. Appl. No. 12/038,760, filed Feb. 27, 2008, 20 pages.
Great Britain Search Report mailed Jan. 16, 2009, for GB Application No. GB0817242.1, filed Sep. 22, 2008, two pages.
Great Britain Search Report mailed Jan. 19, 2010, for GB Application No. GB0817242.1, filed Sep. 22, 2008, two pages.
International Search Report mailed on Mar. 19, 2009, for PCT Application No. PCT/US2008/078836, filed on Oct. 3, 2008, four pages.
International Search Report mailed Jul. 17, 2009, for PCT Application No. PCT/US2009/041460, three pages.
International Search Report mailed Aug. 5, 2009, for PCT Application No. PCT/US2009/041465, filed Apr. 22, 2009, four pages.
International Search Report mailed Jan. 14, 2011, for PCT Application No. PCT/US2010/029698, filed Apr. 1, 2010, 5 pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action mailed Feb. 4, 2011, for U.S. Appl. No. 12/038,760, filed Feb. 27, 2008, 18 pages.
Non-Final Office Action mailed Jul. 8, 2011, for U.S. Appl. No. 12/110,075, filed Apr. 25, 2008, 14 pages.
Non-Final Office Action mailed Jul. 11, 2011, for U.S. Appl. No. 12/110,024, filed Apr. 25, 2008, 12 pages.
Non-Final Office Action mailed Aug. 17, 2011, for U.S. Appl. No. 12/333,250, filed Dec. 11, 2008, 12 pages.
Non-Final Office Action mailed Jan. 25, 2012, for U.S. Appl. No. 12/110,075, filed Apr. 25, 2008, 21 pages.
Non-Final Office Action mailed Jun. 7, 2012, for U.S. Appl. No. 12/500,911, filed Jul. 10, 2009, 16 pages.
Non-Final Office Action mailed Jul. 3, 2012, for U.S. Appl. No. 12/110,024, filed Apr. 25, 2008, 19 pages.
Non-Final Office Action mailed Jan. 2, 2013, for U.S. Appl. No. 12/038,760, filed Feb. 27, 2008, 20 pages.
Non-Final Office Action mailed Mar. 28, 2013, for U.S. Appl. No. 12/110,075, filed Apr. 25, 2008, 14 pages.
Non-Final Office Action mailed Mar. 29, 2013 for U.S. Appl. No. 13/737,779, filed Jan. 9, 2013, nine pages.
Non-Final Office Action mailed Apr. 10, 2014, for U.S. Appl. No. 14/055,717, filed Oct. 16, 2013, 10 pages.
Notice of Allowance mailed Aug. 28, 2012, for U.S. Appl. No. 12/333,250, filed Dec. 11, 2008, nine pages.
Notice of Allowance mailed May 23, 2013, for U.S. Appl. No. 12/110,024, filed Apr. 25, 2008, five pages.
Notice of Allowance mailed Aug. 19, 2013, for U.S. Appl. No. 12/110,075, filed Apr. 25, 2008, eight pages.
Notice of Allowance mailed Aug. 19, 2013, for U.S. Appl. No. 12/500,911, filed Jul. 10, 2009, six pages.
Notice of Allowance mailed Sep. 3, 2013, for U.S. Appl. No. 13/737,779, filed Jan. 9, 2013, 10 pages.
Notice of Allowance mailed Nov. 8, 2013, for U.S. Appl. No. 12,038,760, filed Feb. 27, 2008, 15 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Non-Final Office Action mailed Feb. 10, 2015, for U.S. Appl. No. 14/157,737, filed Jan. 17, 2014, 23 pages.
Notice of Allowance mailed Nov. 7, 2014, for U.S. Appl. No. 14/055,717, filed Oct. 16, 2013, six pages.
Non-Final Office Action mailed Oct. 27, 2015, for U.S. Appl. No. 14/645,120, filed Mar. 11, 2015, eight pages.

\* cited by examiner

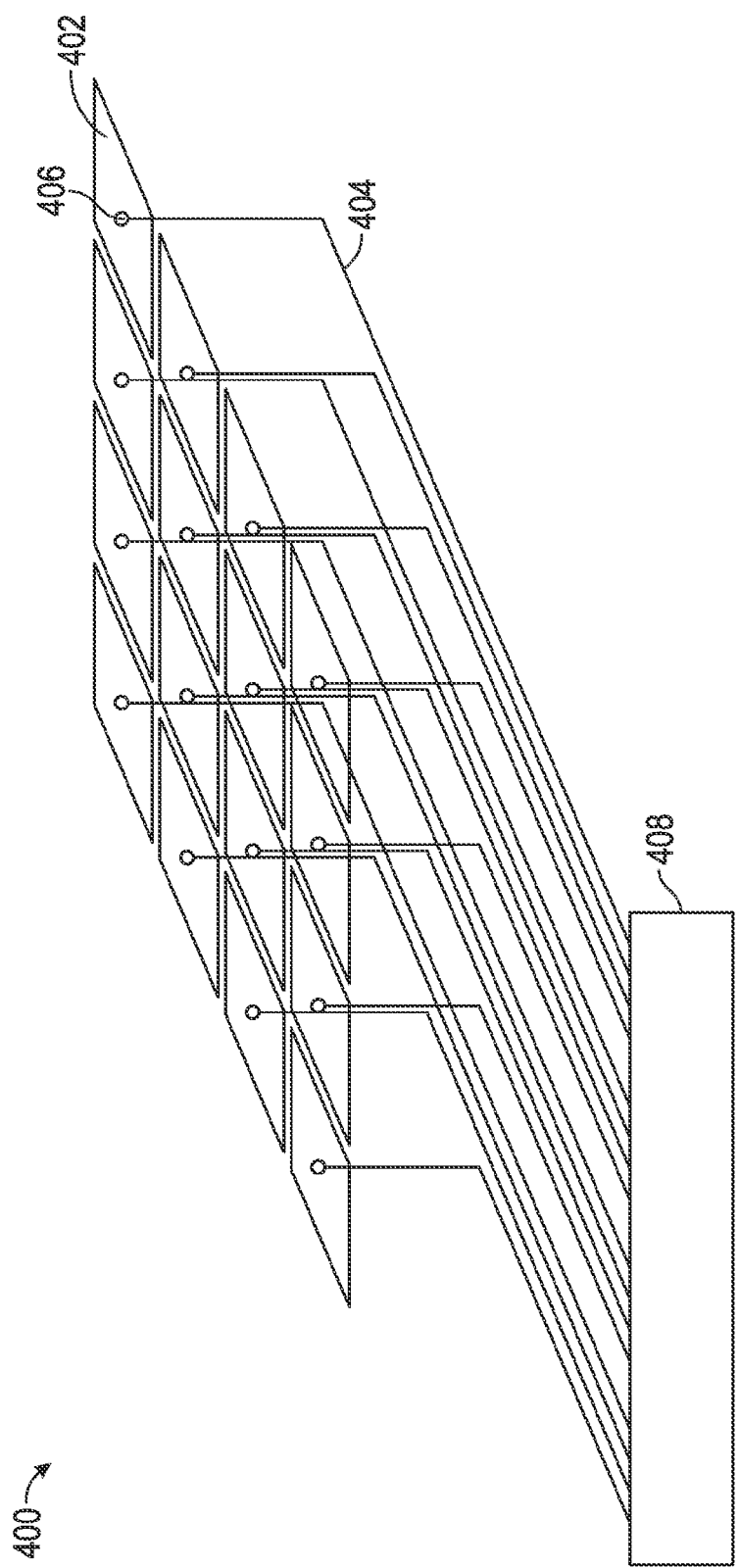

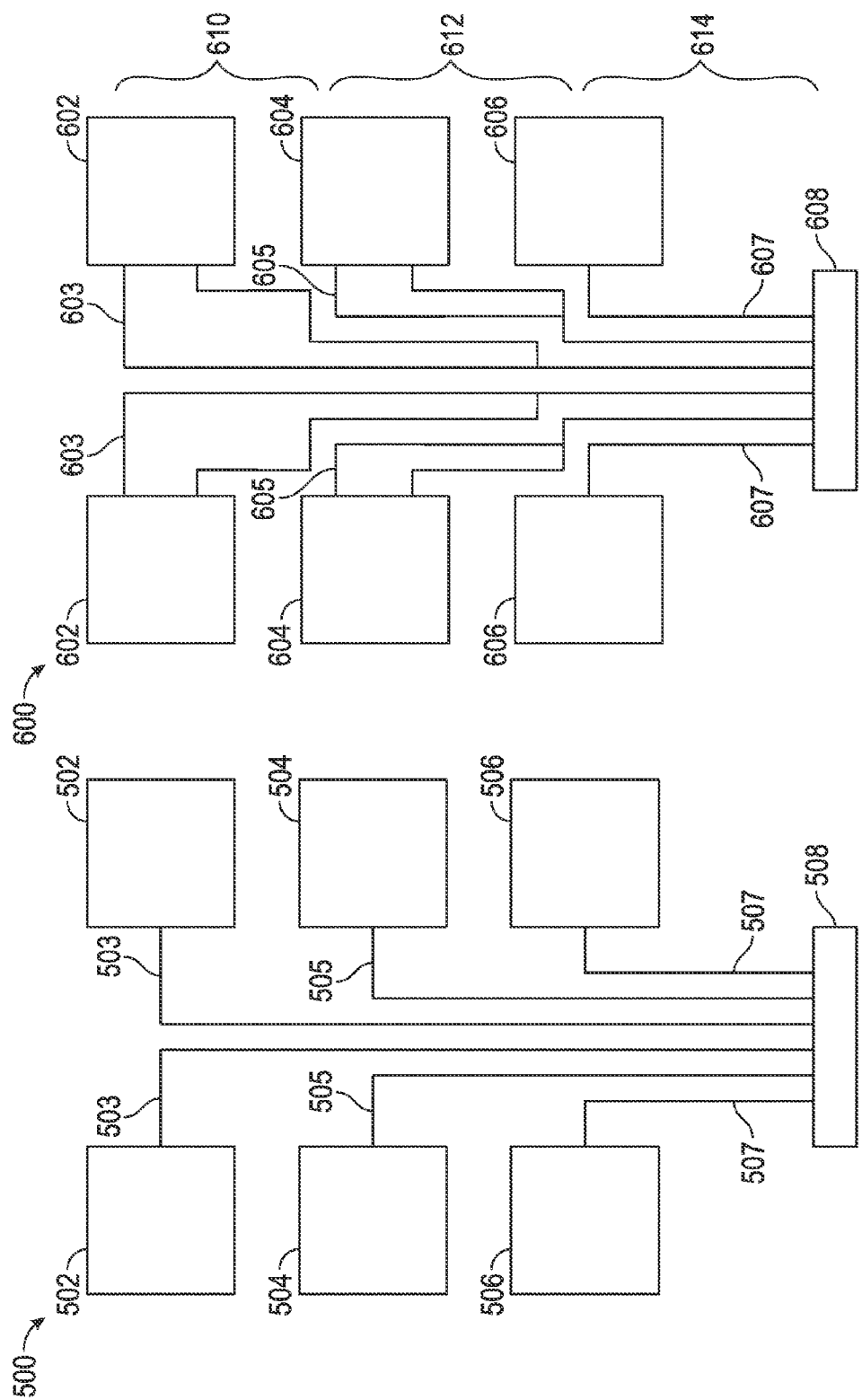

FUNNELED TOUCH SENSOR ROUTING

FIELD OF THE DISCLOSURE

This relates generally to touch sensor panels, and more particularly to touch sensor panels having funneled touch sensor routing.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent conductive plates made of materials such as Indium Tin Oxide (ITO). It is due in part to their substantial transparency that capacitive touch sensor panels can be overlaid on a display to form a touch screen, as described above. Some touch screens can be formed by partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). Touch events can be sensed on the touch sensor panels by detecting changes in the self-capacitance and/or mutual capacitance of the conductive plates. In some examples, the conductive plates can be coupled to sense circuitry using sense connections. It can be beneficial to configure the widths of various portions of these sense connections to maximize the minimum bandwidth of the sense connections on the touch screen. The examples of the disclosure provide various techniques for achieving the above maximization. In some examples, the sense connections can have a funneled configuration to achieve the above maximization.

BRIEF DESCRIPTION OF THE DRAWINGS

FIG. 4 illustrates an exemplary configuration for electrically connecting touch pixels in a touch screen to sense channels according to examples of the disclosure.

FIG. 5 illustrates an exemplary touch screen having touch pixels and sense connections according to examples of the disclosure.

FIG. 6 illustrates an exemplary touch screen having touch pixels and funneled sense connections according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent conductive plates made of materials such as Indium Tin Oxide (ITO), and some touch screens can be formed by partially integrating touch sensing circuitry into a display pixel stackup (i.e., the stacked material layers forming the display pixels). Touch events can be sensed on the touch sensor panels by detecting changes in the self-capacitance and/or mutual capacitance of the conductive plates. In some examples, the conductive plates can be coupled to sense circuitry using sense connections. It can be beneficial to configure the widths of various portions of these sense connections to maximize the minimum bandwidth of the sense connections on the touch screen. The examples of the disclosure provide various techniques for achieving the above maximization. In some examples, the sense connections can have a funneled configuration to achieve the above maximization.

Figure 1A:
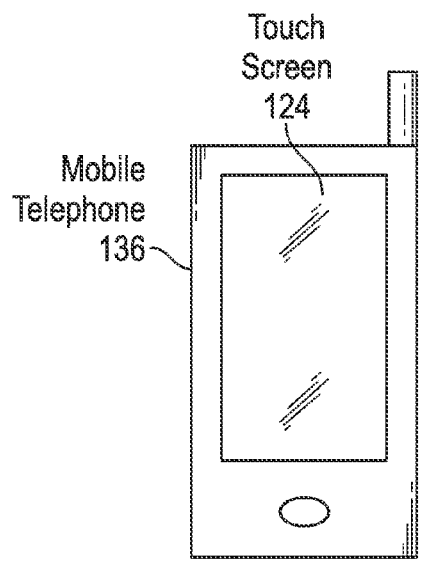
FIGS. 1A-1D illustrate an example mobile telephone, an example media player, an example personal computer and an example tablet computer that can each include an exemplary touch screen according to examples of the disclosure.
Figure 1B:
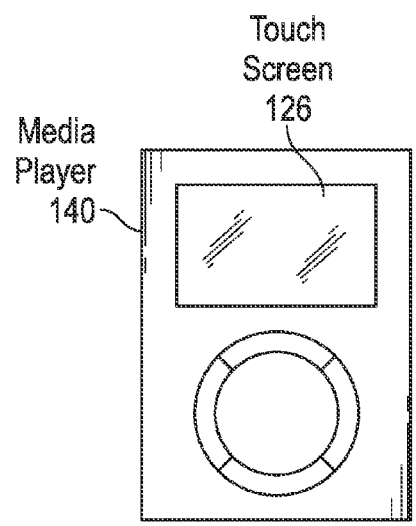
Figure 1C:
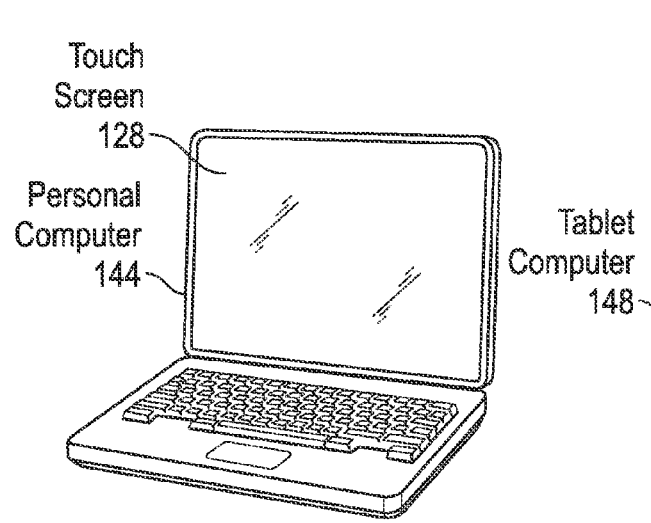
Figure 1D:
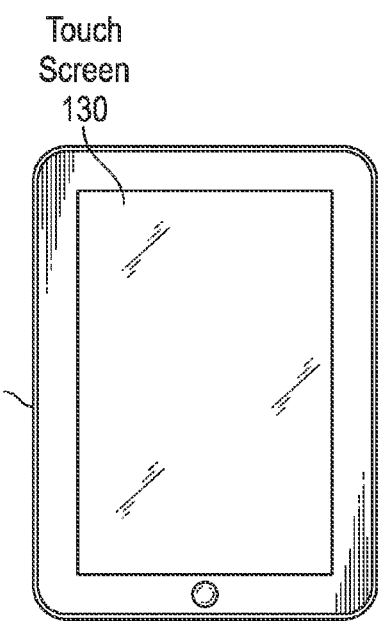

FIGS. 1A-1D show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

While the discussion in this disclosure focuses on touch screens, it is understood that some or all of the examples of the disclosure can similarly be implemented in a touch sensor panel (i.e., a panel having touch sensing circuitry without display circuitry). For brevity, however, the examples of the disclosure will be described in the context of a touch screen.

In some examples, touch screens 124, 126, 128 and 130 can be based on self-capacitance. A self-capacitance based touch system can include a matrix of small plates of conductive material that can be referred to as a touch pixel or a touch pixel electrode. For example, a touch screen can include a plurality of touch pixels, each touch pixel corresponding to a particular location on the touch screen at which touch or proximity (i.e., a touch or proximity event) is to be sensed. Such a touch screen can be referred to as a pixelated self-capacitance touch screen. During operation, the touch pixel can be stimulated with an AC waveform, and the self-capacitance of the touch pixel can be measured. As an object approaches the touch pixel, the self-capacitance of the touch pixel can change. This change in the self-capacitance of the touch pixel can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance of the rows and columns can be detected, similar to above.

In some examples, touch screens 124, 126, 128 and 130 can be based on mutual capacitance. A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, capacitive touch, etc.

Figure 2:
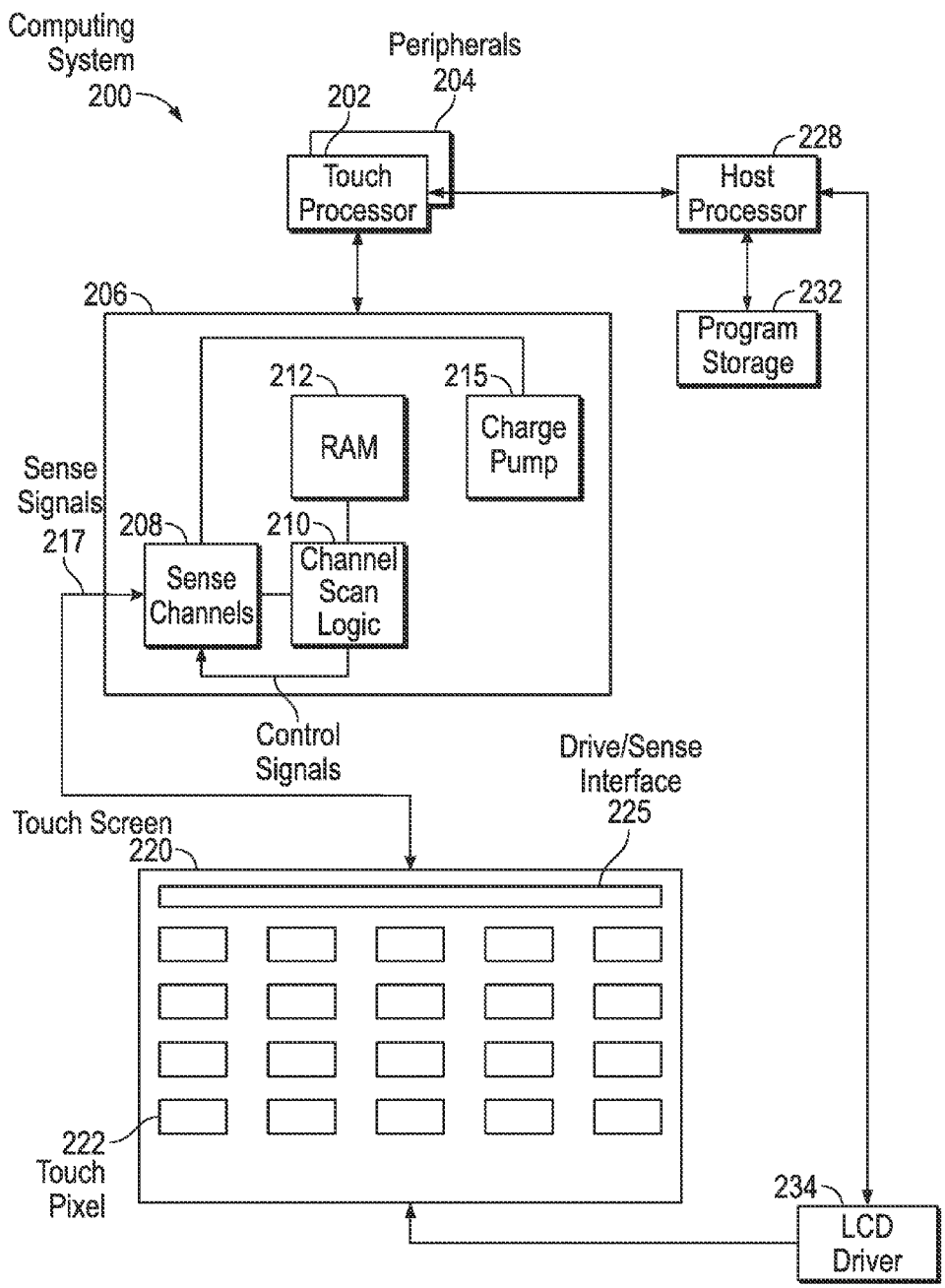
FIG. 2 is a block diagram of an example computing system that illustrates one implementation of an example touch screen according to examples of the disclosure.

FIG. 2 is a block diagram of an example computing system 200 that illustrates one implementation of an example touch screen 220 according to examples of the disclosure. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch pixels of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can be a self-capacitance touch screen, and can include touch sensing circuitry that can include a capacitive sensing medium having a plurality of touch pixels 222 (e.g., a pixelated self-capacitance touch screen). It is understood that while touch screen 220 is described herein as including touch pixels 222, the touch screen can additionally or alternatively include rows and columns of conductive material; the operation of such a touch screen would be similar to that described here. Additionally, it is understood that in some examples, touch screen 220 can be a mutual capacitance touch screen, as described above, though the description that follows will assume that the touch screen is a self-capacitance touch screen having a plurality of touch pixel electrodes ("touch pixels"). Touch pixels 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch pixels 222) as "touch pixels" can be particularly useful when touch screen 220 is viewed as capturing an "image" of touch. In other words, after touch controller 206 has determined an amount of touch detected at each touch pixel 222 in touch screen 220, the pattern of touch pixels in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate an image on touch screen 220, such as an image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
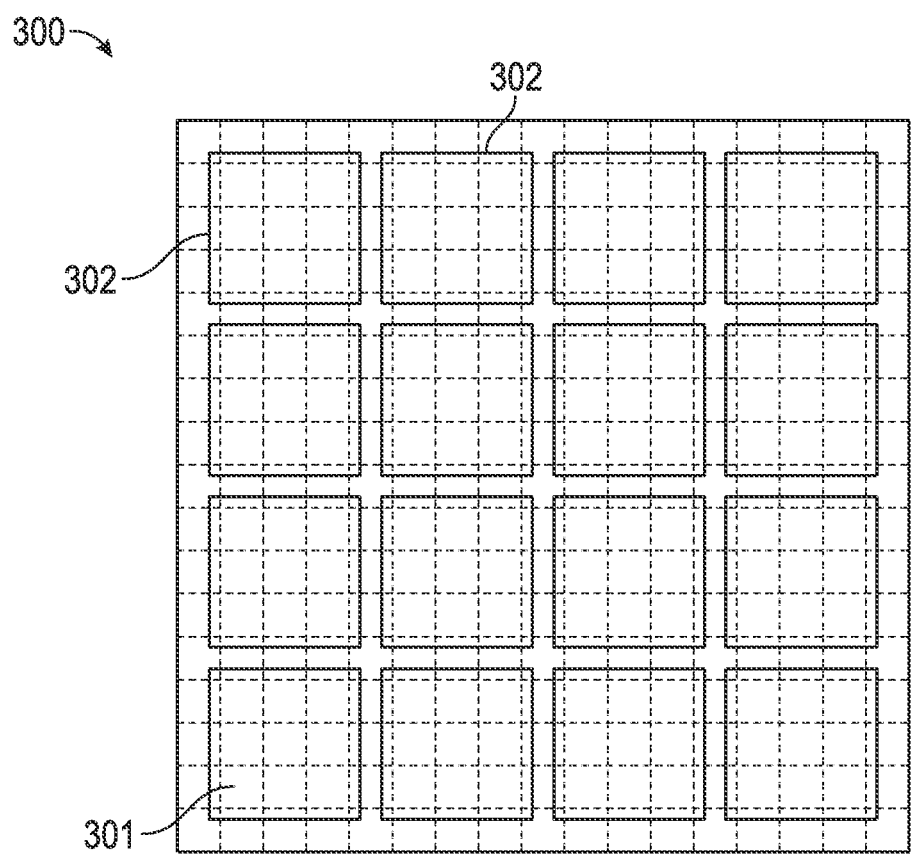
FIG. 3 illustrates an example configuration in which common electrodes can form portions of the touch sensing circuitry of a touch sensing system.

In some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (e.g., OLED displays), such as one or more pixel transistors (e.g., thin film transistors (TFTs)), gate lines, data lines, pixel electrodes and common electrodes. In any given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 3 illustrates an example configuration in which common electrodes 302 can form portions of the touch sensing circuitry of a touch sensing system—in some examples of this disclosure, the common electrodes can form touch pixels used to detect an image of touch on touch screen 300, as described above. Each common electrode 302 (i.e., touch pixel) can include a plurality of display pixels 301, and each display pixel 301 can include a portion of a common electrode 302, which can be a circuit element of the display system circuitry in the display pixel stackup (i.e., the stacked material layers forming the display pixels) of the display pixels of some types of LCD or other displays that can operate as part of the display system to display an image.

In the example shown in FIG. 3, each common electrode 302 can serve as a multi-function circuit element that can operate as display circuitry of the display system of touch screen 300 and can also operate as touch sensing circuitry of the touch sensing system. In this example, each common electrode 302 can operate as a common electrode of the display circuitry of the touch screen 300, as described above, and can also operate as touch sensing circuitry of the touch screen. For example, a common electrode 302 can operate as a capacitive part of a touch pixel of the touch sensing circuitry during the touch sensing phase. Other circuit elements of touch screen 300 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch pixel in an "off" state. Stimulation signals can be applied to common electrode 302. Changes in the total self-capacitance of common electrode 302 can be sensed through an operational amplifier, as previously discussed. The change in the total self-capacitance of common electrode 302 can depend on the proximity of a touch object, such as a finger, to the common electrode. In this way, the measured change in total self-capacitance of common electrode 302 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 302 (i.e., touch pixels) and display pixels 301 of FIG. 3 are shown as rectangular or square regions on touch screen 300. However, it is understood that the common electrodes 302 and display pixels 301 are not limited to the shapes, orientations, and positions shown, but can include any suitable configurations according to examples of the disclosure.

As described above, the self-capacitance of each touch pixel (e.g., touch pixel 222) in the touch screen of the disclosure can be sensed to capture an image of touch across the touch screen. To allow for the sensing of the self-capacitance of individual touch pixels, it can be necessary to route one or more electrical connections between each of the touch pixels and the touch sensing circuitry (e.g., sense channels 208) of the touch screen.

FIG. 4 illustrates an exemplary configuration for electrically connecting touch pixels 402 in touch screen 400 to sense channels 408 according to examples of the disclosure. In some examples, sense channels 408 can be located in a touch controller separate from the touch screen, but in some examples, the sense channels can be located on the touch screen. Touch screen 400 can include touch pixels 402, as described above. Components of touch screen 400 other than touch pixels 402 are not illustrated for ease of description. Each of touch pixels 402 can be electrically connected to sense channels 408 through sense connections 404 and connection points 406. In some examples, sense connections 404 can connect touch pixels 402 to a location on the touch screen (e.g., a flex circuit connection area) from which a separate connection (e.g., a flex circuit) can complete the connection to sense channels 408 (e.g., when the sense channels are located separate from touch screen 400). In some examples, sense connections 404 can connect touch pixels 402 directly to sense channels 408 (e.g., when the sense channels are located on touch screen 400). In some examples, connection points 406 can be vias when sense connections 404 and touch pixels 402 reside in different layers of touch screen 400 (e.g., when the sense connections reside underneath the touch pixels, or when the sense connections reside on top of the touch pixels); it is understood, however, that in some examples, the sense connections and the touch pixels can reside in the same layer of the touch screen, and the connection points can represent a location where the sense connections and the touch pixels connect. As discussed above, in some examples, connection points 406 can allow for an electrical connection between touch pixels 402 and sense connections 404 through one or more intervening layers that may exist between the touch pixels and the sense connections in touch screen 400.

In arranging touch pixels 402 on touch screen 400, it can be beneficial to minimize the distances between the touch pixels to maintain linearity (or minimize non-linearity) across the touch screen. Linearity can refer to the relative stability of the amount of touch signal sensed by touch pixels 402 on touch screen 400 as a finger, or other object, moves across the touch screen. If touch pixels 402 are arranged relatively far apart, as a finger moves from a touch pixel area to a gap area (the area between touch pixels), the amount of touch signal sensed by the touch pixels on touch screen 400 can drop. Then, as the finger moves from the gap area back to touch pixel area, the amount of touch signal sensed by touch pixels 402 on touch screen 400 can rise. Minimizing the distances between touch pixels 402 on touch screen 400 can minimize this modulation of the touch signal. In the case of a touch screen in which the touch pixels (e.g., touch pixels 402) and the sense connections (e.g., sense connections 404) reside on the same process layer, minimizing the distances between the touch pixels can be limited by the configuration of the sense connections.

Although the examples of the disclosure are presented in the context of connecting touch pixels to sense channels, it is understood that the techniques described can be utilized in other contexts involving connections to touch screen components (e.g., connecting mutual capacitance drive lines to drive circuitry).

FIG. 5 illustrates exemplary touch screen 500 having touch pixels 502, 504 and 506 and sense connections 503, 505 and 507 according to examples of the disclosure. Touch pixels 502, 504 and 506 can represent part of two columns of touch pixels 402 on touch screen 400, for example. It is understood that touch screen 500 can include further touch pixels than those illustrated here.

Touch pixels 502 can be coupled to sense channels 508 by sense connections 503, touch pixels 504 can be coupled to the sense channels by sense connections 505, and touch pixels 506 can be coupled to the sense channels by sense connections 507. In the example illustrated, the widths of each of sense connections 503, 505 and 507 can be substantially the same. In some examples, sense connections 503, 505 and 507 can be disposed in the area between touch pixels 502, 504 and 506 (i.e., in the "active area" or "active region" of touch screen 500 in which touch activity can be sensed and/or through which light from a display can be transmitted).

As stated above, it can be beneficial to minimize the distances between touch pixels on touch screen 500 to maintain linearity across the touch screen. Thus, in some examples, touch pixels 506 can be separated by the minimum distance allowed by the fabrication process used to manufacture touch screen 500 (i.e., "minimum process widths"); this can include minimizing touch pixel 506-to-sense connection 507 distances, minimizing sense connection 503, 505 and 507 widths (as all of sense connections 503, 505 and 507 can pass through the active area between touch pixels 506 in the illustrated example), and minimizing sense connection-to-sense connection distances. By minimizing each of the above, touch pixels 506 can be separated by the minimum distance allowed by the utilized process technology. Touch pixels 502 and 504 can also be separated by the same distance separating touch pixels 506 (the above minimum distance) so that touch pixel spacing can be uniform across touch screen 500. In some examples, the vertical spacing between touch pixels (e.g., touch pixel 506-to-touch pixel 504 spacing) can be substantially similar to the above-discussed horizontal spacing of touch pixels.

In this way, touch pixel-to-touch pixel spacing across touch screen 500 can be minimized and uniform. However, the resistance and capacitance of each of sense connections 503, 505 and 507 can differ from sense connection to sense connection. This can be the case because sense connections 503 can have different lengths than sense connections 505 and sense connections 507, as illustrated—thus, with sense connections having different lengths but similar widths, the resistances of the various sense connections can be different. Further, the capacitances associated with the sense connections can differ as each sense connection, due to its routing and configuration, can form different parasitic capacitances with different structures on touch screen 500.

As a result of the above variations, the bandwidth of each sense connection-touch pixel pair (e.g., sense connection 503 and touch pixel 502 pair, sense connection 505 and touch pixel 504 pair, etc.), which can be inversely proportional to the resistance and the capacitance of each sense connection (i.e., inversely proportional to the RC time constant of each sense connection), can be different for sense connections 503, 505 and 507. One of the sense connection-touch pixel pairs can have the lowest bandwidth of the pairs. Because it can be beneficial to operate all of the touch pixels on touch screen 500 at the same frequency (e.g., at the same touch scanning frequency) for uniformity reasons, the sense connection-touch pixel pair having the lowest bandwidth can limit the scanning frequency of all the touch pixels on touch screen 500. In some examples, the sense connection-touch pixel pair having the lowest bandwidth can be the sense connection 503-touch pixel 502 pair, because sense connections 503 can be the longest of the sense connections, thus having the highest resistance and/or capacitance of the sense connections.

It can therefore be beneficial to reduce the resistances of sense connections 503 so as to increase the bandwidth of sense connections 503 (and touch screen 500 as a whole), while maintaining the minimum touch pixel spacing to maintain linearity across the touch screen.

FIG. 6 illustrates exemplary touch screen 600 having touch pixels 602, 604 and 606 and funneled sense connections 603, 605 and 607 according to examples of the disclosure. The configuration of FIG. 6 can be substantially that of FIG. 5, except that sense connections 603, 605 and 607 can have segments of varying widths, as illustrated. In particular, the sense connections 603, 605 and 607 can be made wider as fewer sense connections need to be disposed between touch pixels 602, 604 and 606 (i.e., the sense connections can be "funneled"). Fewer sense connections may need to be disposed in different regions between touch pixels 602, 604 and 606 as respective ones of the sense connections complete their connections to their associated touch pixels. For example, six sense connections may need to be disposed between touch pixels 606 (sense connections 603, 605 and 607), but only four sense connections may need to be disposed between touch pixels 604 (sense connections 603 and 605), because sense connections 607 can have completed their connections to their associated touch pixels 606. Similarly, only two sense connection may need to be disposed between touch pixels 602 (sense connections 603). In some examples, sense connections can "drop off" in the areas between touch pixels, as illustrated; for example, sense connections 607 can "drop off" (i.e., connect to touch pixels 606) in the area between touch pixels 606, sense connections 605 can "drop off" in the area between touch pixels 604, and sense connections 603 can "drop off" in the area between touch pixels 602. In some examples, the sense connections 603, 605 and 607 can connect to their respective touch pixels as close to sense channels 608 as possible, so as to reduce the lengths of the sense connections as much as possible.

As fewer sense connections may need to be disposed between touch pixels (i.e., as sense connections "drop off"), the widths of those remaining sense connections can be made larger, and the total resistances of those sense connections can thus be reduced. As illustrated, sense connections 605 in region 612 can be wider than sense connections 605 in region 614. Similarly, sense connections 603 in region 610 can be wider than sense connections 603 in region 612, which can be wider than sense connections 603 in region 614. By reducing the resistances of the sense connections in this way, including the resistance of the sense connection that may be limiting the bandwidth of touch screen 600, the bandwidth of the touch screen as a whole can be increased.

In some examples, the above changes in sense connection widths can be made such that any resulting increases in capacitance that may occur can be offset by the reductions in resistance, and the RC time constant of the sense connections can be reduced (and thus the bandwidth increased). Thus, in some examples, the sense connection widths may not be increased to completely span the entire area between touch pixels, because this can increase sense connection capacitance more than it can decrease sense connection resistance, resulting in a net decrease in sense connection bandwidth. In some examples, the sense connection widths can be limited to a specified width (e.g., 10% or less of the widths of the touch pixels) to minimize errors in touch centroid accuracy that might be introduced by sense connections that can be too wide (e.g., by the sense connections sensing touch themselves on the order of the amount of touch sensed by the touch pixels); in some examples, the areas of the sense connections can additionally or alternatively be limited for similar reasons. To counter the effects of sense connection segments introducing touch error due to excessive sense connection area/width, the widths of sense connection segments can be increased in sense connections that are closer than a specified distance from touch pixels and reduced in sense connections that are further than the specified distance from touch pixels. In this way, touch centroid shifting that might occur can be limited, as the widest sense connection segments can be located close to the touch pixels. Further, in some examples, the sense connection-to-sense connection distances in each region 610, 612 and 614 can be adjusted to optimize sense connection-to-sense connection capacitances to further reduce the RC time constants of the sense connections.

It should be noted that for the self-capacitance touch screens of the disclosure, it can also be important to minimize any capacitance that may be seen by the sense connections in order to maximize the sense connection bandwidth. Capacitances between a sense connection and other sense connections, capacitances between a sense connection and touch pixels, etc., can all contribute to the total self-capacitance of a sense connection-touch pixel pair sensed by the sense circuitry; thus, the distance between sense connections (and between sense connections and touch pixels) can be adjusted while taking such capacitances into account. In some examples, ensuring that sense connection-to-touch pixel spacing is greater than a threshold distance can maintain sense connection-to-touch pixel capacitance at an acceptable level. Similarly, in some examples, ensuring that sense connection-to-sense connection spacing is greater than a threshold amount can maintain sense connection-to-sense connection capacitance at an acceptable level. In contrast to self-capacitance touch screens, for the mutual capacitance touch screens of the disclosure, because the capacitance of interest can be the mutual capacitance formed between a drive region and a sense region, other capacitances that may be seen by the sense connections (e.g., sense connection-to-sense connection capacitances) may not be as important to reduce or consider.

It is understood that the precise funneled sense connection configuration illustrated in FIG. 6 is illustrative only, and that other configurations are also within the scope of the disclosure. For example, though sense connections 603 and 605 are illustrated as having substantially similar widths in region 612, they may instead have differing widths. Additionally, the widths of sense connections 605 (and any of the other sense connections) may be different from each other within each region; for example, the width of sense connection 605 on the left can be different from the width of sense connection 605 on the right. The scope of the disclosure extends to any sense connection configuration in which extra area on touch screen 600 can be utilized to decrease the RC time constants of sense connections by adjusting the widths, shapes, spacing, and/or any other characteristics of the sense connections to extend into the extra area.

Figure 7:
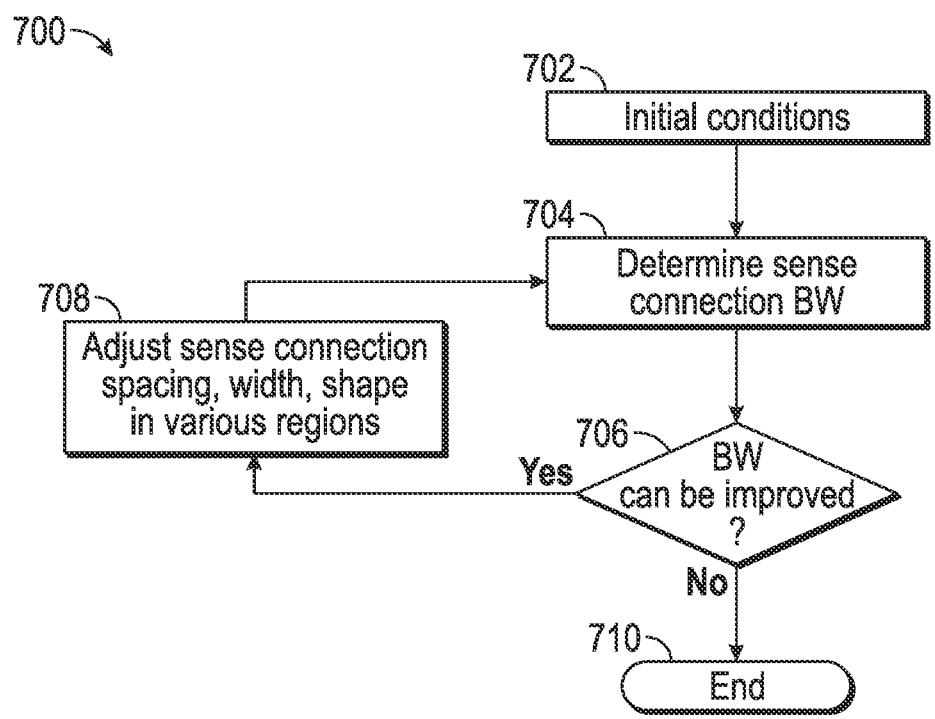
FIG. 7 illustrates an exemplary process flow for optimizing sense connection layouts in different regions of a touch screen according to examples of the disclosure.

FIG. 7 illustrates an exemplary process flow 700 for optimizing sense connection layouts in different regions of a touch screen according to examples of the disclosure.

At 702, the process can begin with an initial sense connection layout. This initial layout can be, for example, the layout described with respect to FIG. 5. The initial layout can be described in terms of a set of initial conditions. For example, the distance between touch pixels (or touch pixel columns), the number of sense connections needed to couple to the touch pixels, the lengths of the sense connections, the total touch pixel self-capacitance (e.g., "touch pixel-to-world self capacitance"), sense connection segment widths, sense connection-to-sense connection separations, sense connection-to-touch pixel separations, or any other initial condition relating to the layout of the touch pixels and the sense connections can be used to define the initial layout. One or more of these initial conditions can be designated as fixed, whereas others of these initial conditions can be designated as variable (i.e., to be optimized). For example, the distance between touch pixels (or touch pixel columns) can be designated as fixed, whereas sense connection segment widths can be designated as variable.

At 704, the bandwidths of the sense connections can be determined, and the sense connection with the limiting bandwidth can be identified. The bandwidths of the sense connections can be determined using any method suitable for such determinations, such as using field extraction and SPICE (Simulation Program with Integrated Circuit Emphasis) analysis that accounts for one or more of the variables discussed above. After the bandwidths of the sense connections are determined, sense connections 503, for example, can be identified as the sense connections having bandwidths that can limit the bandwidth of touch screen 500. In some examples, in addition to or alternatively to bandwidth, other parameters relating to one or more of the previously described centroid inaccuracy and linearity considerations can also be determined at 704 for optimization during process 700. In such examples, a general figure of merit (FOM) that can be a function of one or more of bandwidth, linearity, and/or centroid inaccuracy can be determined at 704.

At 706, whether the limiting bandwidth can be improved can be determined. For example, as described with respect to FIG. 6, it can be determined whether extra area on touch screen 600 in regions 610 and/or 612 exists such that changes to the widths, shapes, spacing, and/or any other variable characteristics of the sense connections can be made to increase the limiting bandwidth of the sense connections. Any fixed constraints on sense connection optimization can be considered here; for example, a constraint on the distance between touch pixels 606. Additionally, other considerations can further be accounted for here, such as minimizing non-linearity (as described above) or touch centroid inaccuracy due to sense connection segment widths that may become too wide (and thus may begin to act as the touch pixels themselves, possibly shifting the centroids of touch detection of the touch pixels away from the touch pixels and towards the sense connection segments). In such examples, a general figure of merit (FOM) that can be a function of one or more of bandwidth, linearity, and/or centroid inaccuracy can be checked for improvement at 706.

If the limiting bandwidth or the FOM can be improved as described in this disclosure, at 708, a bandwidth or FOM improvement-providing change to the sense connection layout can be made, and the bandwidths of the sense connections in the new layout or the FOM can be determined again at 704. For example, the widths of one or more sense connection segments can be increased to improve the bandwidths of the sense connections.

If the limiting bandwidth or the FOM cannot be improved as described in this disclosure, at 710, the process can end with the current sense connection layout.

Thus, the examples of the disclosure provide one or more configurations for increasing the bandwidth of sense connections in a touch screen while maintaining specified touch pixel spacing.

Therefore, according to the above, some examples of the disclosure are directed to a touch sensor panel comprising: a first touch pixel coupled to a first sense connection and a second touch pixel coupled to a second sense connection, the first sense connection having a first portion disposed in a first active region of the touch sensor panel between the first touch pixel and the second touch pixel, and the second sense connection having a second portion disposed in the first active region; and a third touch pixel coupled to a third sense connection and a fourth touch pixel coupled to a fourth sense connection, the third sense connection having a third portion disposed in the first active region and a fourth portion disposed in a second active region of the touch sensor panel between the third touch pixel and the fourth touch pixel, and the fourth sense connection having a fifth portion disposed in the first active region and a sixth portion disposed in the second active region, wherein: a width of the fourth portion of the third sense connection is larger than a width of the third portion of the third sense connection, and widths of the first portion of the first sense connection, the second portion of the second sense connection, the third portion of the third sense connection and the fifth portion of the fourth sense connection are substantially the same in the first active region. Additionally or alternatively to one or more of the examples disclosed above, in some examples, a distance between the first touch pixel and the second touch pixel is based on minimum process widths. Additionally or alternatively to one or more of the examples disclosed above, in some examples, the widths of the first portion of the first sense connection, the second portion of the second sense connection, the third portion of the third sense connection and the fifth portion of the fourth sense connection are minimum process widths. Additionally or alternatively to one or more of the examples disclosed above, in some examples, a distance between the first touch pixel and the first sense connection is the minimum process distance, a distance between the first sense connection and the third sense connection is the minimum process distance, a distance between the fourth sense connection and the second sense connection is the minimum process distance, and a distance between the second sense connection and the second touch pixel is the minimum process distance. Additionally or alternatively to one or more of the examples disclosed above, in some examples, the width of the fourth portion of the third sense connection is configured such that a bandwidth of the third sense connection is greater than a bandwidth of the third sense connection with the fourth portion having a different width. Additionally or alternatively to one or more of the examples disclosed above, in some examples, the width of the fourth portion of the third sense connection is configured such that a resistance of the third sense connection is less than a resistance of the third sense connection with the fourth portion having a different width. Additionally or alternatively to one or more of the examples disclosed above, in some examples, the width of the fourth portion of the third sense connection is configured such that a capacitance of the third sense connection is less than a capacitance of the third sense connection with the fourth portion having a different width. Additionally or alternatively to one or more of the examples disclosed above, in some examples, the first touch pixel, the second touch pixel, the third touch pixel and the fourth touch pixel comprise self-capacitance touch pixels. Additionally or alternatively to one or more of the examples disclosed above, in some examples, the fourth portion of the third sense connection and the sixth portion of the fourth sense connection are configured so as to minimize touch centroid inaccuracy on the touch sensor panel. Additionally or alternatively to one or more of the examples disclosed above, in some examples, the fourth portion of the third sense connection and the sixth portion of the fourth sense connection are configured so as to minimize touch non-linearity of the touch sensor panel.

Some examples of the disclosure are directed to a method of fabricating a touch sensor panel, the method comprising: forming a first touch pixel, a second touch pixel, a third touch pixel and a fourth touch pixel; coupling the first touch pixel to a first sense connection and the second touch pixel to a second sense connection, the first sense connection having a first portion disposed in a first active region of the touch sensor panel between the first touch pixel and the second touch pixel, and the second sense connection having a second portion disposed in the first active region; and coupling the third touch pixel to a third sense connection and the fourth touch pixel to a fourth sense connection, the third sense connection having a third portion disposed in the first active region and a fourth portion disposed in a second active region of the touch sensor panel between the third touch pixel and the fourth touch pixel, and the fourth sense connection having a fifth portion disposed in the first active region and a sixth portion disposed in the second active region, wherein: a width of the fourth portion of the third sense connection is larger than a width of the third portion of the third sense connection, and widths of the first portion of the first sense connection, the second portion of the second sense connection, the third portion of the third sense connection and the fifth portion of the fourth sense connection are substantially the same in the first active region. Additionally or alternatively to one or more of the examples disclosed above, in some examples, a distance between the first touch pixel and the second touch pixel is based on minimum process widths. Additionally or alternatively to one or more of the examples disclosed above, in some examples, the widths of the first portion of the first sense connection, the second portion of the second sense connection, the third portion of the third sense connection and the fifth portion of the fourth sense connection are minimum process widths. Additionally or alternatively to one or more of the examples disclosed above, in some examples, a distance between the first touch pixel and the first sense connection is the minimum process distance, a distance between the first sense connection and the third sense connection is the minimum process distance, a distance between the fourth sense connection and the second sense connection is the minimum process distance, and a distance between the second sense connection and the second touch pixel is the minimum process distance. Additionally or alternatively to one or more of the examples disclosed above, in some examples, the width of the fourth portion of the third sense connection is configured such that a bandwidth of the third sense connection is greater than a bandwidth of the third sense connection with the fourth portion having a different width. Additionally or alternatively to one or more of the examples disclosed above, in some examples, the width of the fourth portion of the third sense connection is configured such that a resistance of the third sense connection is less than a resistance of the third sense connection with the fourth portion having a different width. Additionally or alternatively to one or more of the examples disclosed above, in some examples, the width of the fourth portion of the third sense connection is configured such that a capacitance of the third sense connection is less than a capacitance of the third sense connection with the fourth portion having a different width. Additionally or alternatively to one or more of the examples disclosed above, in some examples, forming the first touch pixel, the second touch pixel, the third touch pixel and the fourth touch pixel comprises forming self-capacitance touch pixels. Additionally or alternatively to one or more of the examples disclosed above, in some examples, the fourth portion of the third sense connection and the sixth portion of the fourth sense connection are configured so as to minimize touch centroid inaccuracy on the touch sensor panel. Additionally or alternatively to one or more of the examples disclosed above, in some examples, the fourth portion of the third sense connection and the sixth portion of the fourth sense connection are configured so as to minimize touch non-linearity of the touch sensor panel.

Some examples of the disclosure are directed to a method of creating a touch sensor panel layout, the method comprising: providing an initial sense connection characteristic for a sense connection, the sense connection configured to be coupled to a touch pixel; determining a figure of merit associated with the sense connection and the touch pixel; determining whether the initial sense connection characteristic can be modified to improve the figure of merit; and in accordance with a determination that the figure of merit can be improved, modifying the initial sense connection characteristic to improve the figure of merit. Additionally or alternatively to one or more of the examples disclosed above, in some examples, the initial sense connection characteristic comprises a width of the sense connection. Additionally or alternatively to one or more of the examples disclosed above, in some examples, the figure of merit is based on a bandwidth associated with the sense connection and the touch pixel. Additionally or alternatively to one or more of the examples disclosed above, in some examples, the figure of merit is based on a touch non-linearity associated with the sense connection and the touch pixel. Additionally or alternatively to one or more of the examples disclosed above, in some examples, the figure of merit is based on a touch centroid associated with the sense connection and the touch pixel.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
a first touch pixel coupled to a first sense connection and a second touch pixel coupled to a second sense connection, the first sense connection having a first portion disposed in a first active region of the touch sensor panel between the first touch pixel and the second touch pixel, and the second sense connection having a second portion disposed in the first active region; and
a third touch pixel coupled to a third sense connection and a fourth touch pixel coupled to a fourth sense connection, the third sense connection having a third portion disposed in the first active region and a fourth portion disposed in a second active region of the touch sensor panel between the third touch pixel and the fourth touch pixel, and the fourth sense connection having a fifth portion disposed in the first active region and a sixth portion disposed in the second active region,
wherein:
a width of the fourth portion of the third sense connection is larger than a width of the third portion of the third sense connection, and
widths of the first portion of the first sense connection, the second portion of the second sense connection, the third portion of the third sense connection and the fifth portion of the fourth sense connection are substantially the same in the first active region.

2. The touch sensor panel of claim 1, wherein a distance between the first touch pixel and the second touch pixel is based on minimum process widths.

3. The touch sensor panel of claim 2, wherein the widths of the first portion of the first sense connection, the second portion of the second sense connection, the third portion of the third sense connection and the fifth portion of the fourth sense connection are minimum process widths.

4. The touch sensor panel of claim 2, wherein:
a distance between the first touch pixel and the first sense connection is the minimum process distance, a distance between the first sense connection and the third sense connection is the minimum process distance,
a distance between the fourth sense connection and the second sense connection is the minimum process distance, and
a distance between the second sense connection and the second touch pixel is the minimum process distance.

5. The touch sensor panel of claim 1, wherein the width of the fourth portion of the third sense connection is configured such that a bandwidth of the third sense connection is greater than a bandwidth of the third sense connection with the fourth portion having a different width.

6. The touch sensor panel of claim 5, wherein the width of the fourth portion of the third sense connection is configured such that a resistance of the third sense connection is less than a resistance of the third sense connection with the fourth portion having a different width.

7. The touch sensor panel of claim 5, wherein the width of the fourth portion of the third sense connection is configured such that a capacitance of the third sense connection is less than a capacitance of the third sense connection with the fourth portion having a different width.

8. The touch sensor panel of claim 1, wherein the first touch pixel, the second touch pixel, the third touch pixel and the fourth touch pixel comprise self-capacitance touch pixels.

9. The touch sensor panel of claim 1, wherein the fourth portion of the third sense connection and the sixth portion of the fourth sense connection are configured so as to minimize touch centroid inaccuracy on the touch sensor panel.

10. The touch sensor panel of claim 1, wherein the fourth portion of the third sense connection and the sixth portion of the fourth sense connection are configured so as to minimize touch non-linearity of the touch sensor panel.

11. A method of fabricating a touch sensor panel, the method comprising:
forming a first touch pixel, a second touch pixel, a third touch pixel and a fourth touch pixel;
coupling the first touch pixel to a first sense connection and the second touch pixel to a second sense connection, the first sense connection having a first portion disposed in a first active region of the touch sensor panel between the first touch pixel and the second touch pixel, and the second sense connection having a second portion disposed in the first active region; and
coupling the third touch pixel to a third sense connection and the fourth touch pixel to a fourth sense connection, the third sense connection having a third portion disposed in the first active region and a fourth portion disposed in a second active region of the touch sensor panel between the third touch pixel and the fourth touch pixel, and the fourth sense connection having a fifth portion disposed in the first active region and a sixth portion disposed in the second active region,
wherein:
a width of the fourth portion of the third sense connection is larger than a width of the third portion of the third sense connection, and
widths of the first portion of the first sense connection, the second portion of the second sense connection, the third portion of the third sense connection and the fifth portion of the fourth sense connection are substantially the same in the first active region.

12. The method of claim 11, wherein a distance between the first touch pixel and the second touch pixel is based on minimum process widths.

13. The method of claim 12, wherein the widths of the first portion of the first sense connection, the second portion of the second sense connection, the third portion of the third sense connection and the fifth portion of the fourth sense connection are minimum process widths.

14. The method of claim 12, wherein:
a distance between the first touch pixel and the first sense connection is the minimum process distance,
a distance between the first sense connection and the third sense connection is the minimum process distance,
a distance between the fourth sense connection and the second sense connection is the minimum process distance, and
a distance between the second sense connection and the second touch pixel is the minimum process distance.

15. The method of claim 11, wherein the width of the fourth portion of the third sense connection is configured such that a bandwidth of the third sense connection is greater than a bandwidth of the third sense connection with the fourth portion having a different width.

16. The method of claim 15, wherein the width of the fourth portion of the third sense connection is configured such that a resistance of the third sense connection is less than a resistance of the third sense connection with the fourth portion having a different width.

17. The method of claim 15, wherein the width of the fourth portion of the third sense connection is configured such that a capacitance of the third sense connection is less than a capacitance of the third sense connection with the fourth portion having a different width.

18. The method of claim 11, wherein forming the first touch pixel, the second touch pixel, the third touch pixel and the fourth touch pixel comprises forming self-capacitance touch pixels.

19. The method of claim 11, wherein the fourth portion of the third sense connection and the sixth portion of the fourth sense connection are configured so as to minimize touch centroid inaccuracy on the touch sensor panel.

20. The method of claim 11, wherein the fourth portion of the third sense connection and the sixth portion of the fourth sense connection are configured so as to minimize touch non-linearity of the touch sensor panel.

21. A method of creating a touch sensor panel layout, the method comprising:
providing an initial sense connection characteristic for a sense connection, the sense connection configured to be coupled to a touch pixel;
determining a figure of merit associated with the sense connection and the touch pixel;
determining whether the initial sense connection characteristic can be modified to improve the figure of merit; and
in accordance with a determination that the figure of merit can be improved, modifying the initial sense connection characteristic to improve the figure of merit.

22. The method of claim 21, wherein the initial sense connection characteristic comprises a width of the sense connection.

23. The method of claim 21, wherein the figure of merit is based on a bandwidth associated with the sense connection and the touch pixel.

24. The method of claim 21, wherein the figure of merit is based on a touch non-linearity associated with the sense connection and the touch pixel.

25. The method of claim 21, wherein the figure of merit is based on a touch centroid associated with the sense connection and the touch pixel.

* * * * *